United States Patent [19]

Walters

[11] E Patent Number: Re. 32,911

[45] Reissued Date of Patent: Apr. 25, 1989

[54] ADJUSTABLE WAVEFORM SPARK SOURCE

[75] Inventor: John P. Walters, Madison, Wis.

[73] Assignee: Wisconsin Alumni Research Foundation, Madison, Wis.

[21] Appl. No.: 157,286

[22] Filed: Jun. 6, 1980

Related U.S. Patent Documents

Reissue of:

[64] Patent No.: 3,749,975
Issued: Jul. 31, 1973
Appl. No.: 66,920
Filed: Aug. 26, 1970

U.S. Applications:

[63] Continuation-in-part of Ser. No. 800,180, Feb. 18, 1969, abandoned.

[51] Int. Cl.[4] ..... H05B 7/20; G01J 3/443

[52] U.S. Cl. ..... 356/313; 315/207; 315/241 R; 315/243

[58] Field of Search ..... 315/209 CD, 227, 237, 315/238, 240, 241 R, 241 P, 241 S, 242–245, 207; 356/313

[56] References Cited

U.S. PATENT DOCUMENTS

| | | | |
|---|---|---|---|
| 2,895,080 | 7/1959 | Branker | 315/205 |
| 2,980,798 | 4/1961 | Romand et al. | 356/313 X |
| 3,202,874 | 8/1965 | Bardocz | 315/241 R X |
| 3,234,431 | 2/1966 | Bardocz | 315/241 R X |
| 3,246,113 | 4/1966 | Scarpelli | 315/227 R X |
| 3,283,116 | 11/1966 | Scarpelli | 315/227 R X |
| 3,316,381 | 4/1967 | Gibson | 315/243 X |
| 3,465,203 | 9/1969 | Galster et al. | 315/173 |

OTHER PUBLICATIONS

Walters et al, *Emission Characteristics and Sensitivity in a High-Voltage Spark Discharge,* Analytical Chemistry, vol. 37, Nov. 1965, pp. 1484–1503.

Murray et al, *Properties and Use of a High Frequency Spark Discharge for Local Micro-Analysis,* J.O.S.A., vol. 31, Jun. 1941, pp. 433–438.

Scheibe et al, *Uber Eine Neue Anwendung der Emissionsspektraskopie zur Lokalen Mikroanalyse,* Spectrochimica Acta, vol. 1, No. 47, 1939, pp. 47–65.

Walters et al, *Oscilloscopic Characterization of an Electronically Ignited Spark Source,* Applied Spectroscopy, vol. 20, No. 2, Mar./Apr. 1966, pp. 80–89.

*Primary Examiner*—Eugene R. LaRoche
*Assistant Examiner*—B. Lee
*Attorney, Agent, or Firm*—Burmeister, York, Palmatier, Hamby & Jones

[57] ABSTRACT

A capacitor is charged to a high voltage, and then is discharged through a circuit comprising an analytical spark gap and first and second inductive elements, whereby the discharge current is oscillatory. The waveform of the discharge current is modified by a diode rectifier shunted across the series combination of the analytical spark gap and the second inductive element. To provide for adjustment of the waveform over a wide range, the second inductive element is adjustable in inductance. The first inductive element is also preferably adjustable in inductance. Provision may also be made for changing the capacitance of the capacitor. A reversing switch makes it possible to reverse the polarity of the diode rectifier. One or more control spark gaps may be connected in series with the analytical spark gap. An electronic switching device may be connected across one of the control spark gaps to initiate the discharge of the capacitor. Either or both of the inductive elements may be replaced with other reactances or impedances, such as transmission lines. Coupling may be provided between the inductive elements. Inductance or impedance may be provided in the diode circuit. The capacitor may be replaced with some other source of alternating current or pulses. The spark may be ignited by high voltage, developed at a radio frequency by a quarter wave line. The diode rectifier may be replaced with a silicon controlled rectifier, silicon controlled switch, or some other active element.

46 Claims, 9 Drawing Sheets

ADJUSTABLE WAVEFORM SPARK SOURCE

Matter enclosed in heavy brackets [ ] appears in the original patent but forms no part of this reissue specification; matter printed in italics indicates the additions made by reissue.

The invention described herein was made in the course of or under a grant from the National Science Foundation, an agency of the United States Government.

This application is a continuation in part of my copending application, Ser. No. 800,180, filed Feb. 18, 1969 now abandoned *and a reissue of application Ser. No. 800,180 now U.S. Pat. No. 3,749,975.*

This invention relates to spark sources, which will find many applications, but are especially advantageous as light sources for spectroscopic analysis, particularly optical emission spectrometry and spectro-chemistry.

Spark type light sources have an established place in optical emission spectrometry and other spectroscopic analytical techniques, whereby the composition of test samples can be determined. In such techniques, spark discharges are produced across an analytical spark gap. Material from the sample to be analyzed is introduced into the spark gap in that some of the material is vaporized by the spark discharges. The light emitted by the spark discharges is analyzed spectroscopically to determine the composition of the material. Generally speaking, the emitted light produces complex spectra containing many spectral lines. The spectroscopic analysis involves noting the presence of various spectral lines and measuring their relative intensities. By such spectroscopic techniques, it is possible to make accurate analyses of a wide variety of materials. Such techniques are especially valuable in analyzing metals and metal alloys. The basic composition of a metal alloy and the quantities of any impurities present in the alloy can be measured with a high degree of accuracy and sensitivity. Moreover, the test sample of the material to be analyzed can be very small in size.

The spark discharge is generally produced by charging a capacitor and then discharging it across the analytical spark gap. The capacitor is charged from a direct current power supply which delivers a high voltage.

The discharge current through the spark gap tends to be oscillatory because of inductance in the discharge circuit. There is always a certain amount of inherent inductance. Moreover, an inductive element, such as an inductance coil, may be provided in the discharge circuit to provide for an oscillatory discharge at a definite frequency. Thus, the discharge current generally comprises a damped train of alternating current pulses. The damping is provided by the effective resistance of the spark gap and the resistance of the other elements in the discharge circuit.

One object of the present invention is to provide a spark type light source which is constructed and arranged so that the waveform of the oscillatory discharge current can be adjusted. Such adjustment makes it possible to carry out the spectroscopic analyses with considerably improved accuracy and facility. By providing for adjustment of the waveform, it is possible to produce a discharge current waveform having a high peak value in one half cycle, followed by a low peak value in the next half cycle. Thus, the current pulses are alternately at high and low peak values. The high value pulses have the advantage of producing high vaporization of the material to be analyzed. The alternate low value pulses make it possible to take spectroscopic photographs having improved contrast and resolution, particularly as to various weak spectral lines which tend to be obscured by background radiation. The accurate determination of intensities of such weak spectral lines is an important factor in the analysis of various materials, particularly as to the presence of impurities in metal alloys. It is a known technique to take spectroscopic photographs which are resolved or spread out as to time, so that the spectral lines corresponding to different portions of the oscillatory discharge current can be separately measured.

In accordance with the present invention, a diode rectifier is shunted across the analytical spark gap and a reactive element is connected in series therewith. The reactive element may comprise an inductance coil, a transmission line or some other impedance. Usually, the reactive element predominantly comprises inductive reactance but capacitive reactance and resistance will always be present to some degree. The diode rectifier modifies the waveform of the oscillatory discharge current, so that the pulses are of alternately high and low peak values. The reactive element may be adjustable in inductive reactance. By adjusting this reactance, it is possible to adjust the waveform of the discharge current over a wide range. In particular, the magnitude of the smaller pulses can be changed without greatly affecting the magnitude of the alternate larger pulses. It is even possible to reverse the polarity of the intermediate smaller pulses so that the spark discharge current is undirectional. Preferably, the discharge circuit also includes another reactive element which is not shunted by the diode rectifier, but is the major factor in determining the basic frequency of the oscillatory discharge. The additional reactive element may comprise an inductance coil, a transmission line or some other impedance. Here again, the reactive element usually predominantly comprises inductive reactance, but capactive reactance and resistance will also be present. The additional reactive element may also be adjustable or variable in reactance. The variation of either reactive element affects the waveform of the discharge current. The value of the storage capacitor may also be adjustable. In some cases, the discharge circuit includes one or more control gaps, in series with the analytical spark gap. The discharge of the capacitor may be initiated by triggering an electronic switching device, connected across one of the control spark gaps.

Various other objects, advantages and features of the present invention will appear from the following description, taken with the accompanying drawings, in which:

FIG. 1 is a schematic circuit diagram of an adjustable waveform spark type light source to be described as an illustrative embodiment of the present invention.

[FIG. 2 comprises] *FIGS. 2a–2d comprise* a series of diagrams illustrating the manner in which the diode rectifier and the associated reactive element modify the waveform of the discharge current.

[FIG. 3 comprises] *FIGS. 3a–3d comprise* a series of waveform diagrams, showing the manner in which the waveform of the discharge current is varied by changing the inductance of the shunted reactive element.

[FIG. 4 comprises] *FIGS. 4a–4d comprise* a series of waveform diagrams, illustrating the manner in which the waveform of the discharge current is varied by changing the inductance of the unshunted reactive element.

[FIG. 5 comprises] *FIGS. 5a–5h comprise* a series of oscillograms showing the changing waveform of the spark gap current with changes in the values of the reactive elements.

FIG. 6 comprises a series of graphs showing the changes in the spectrograms, produced by changes in the waveform of the spark gap current.

FIG. 7 comprises a series of graphs constituting a continuation of FIG. 6.

Figure 1:
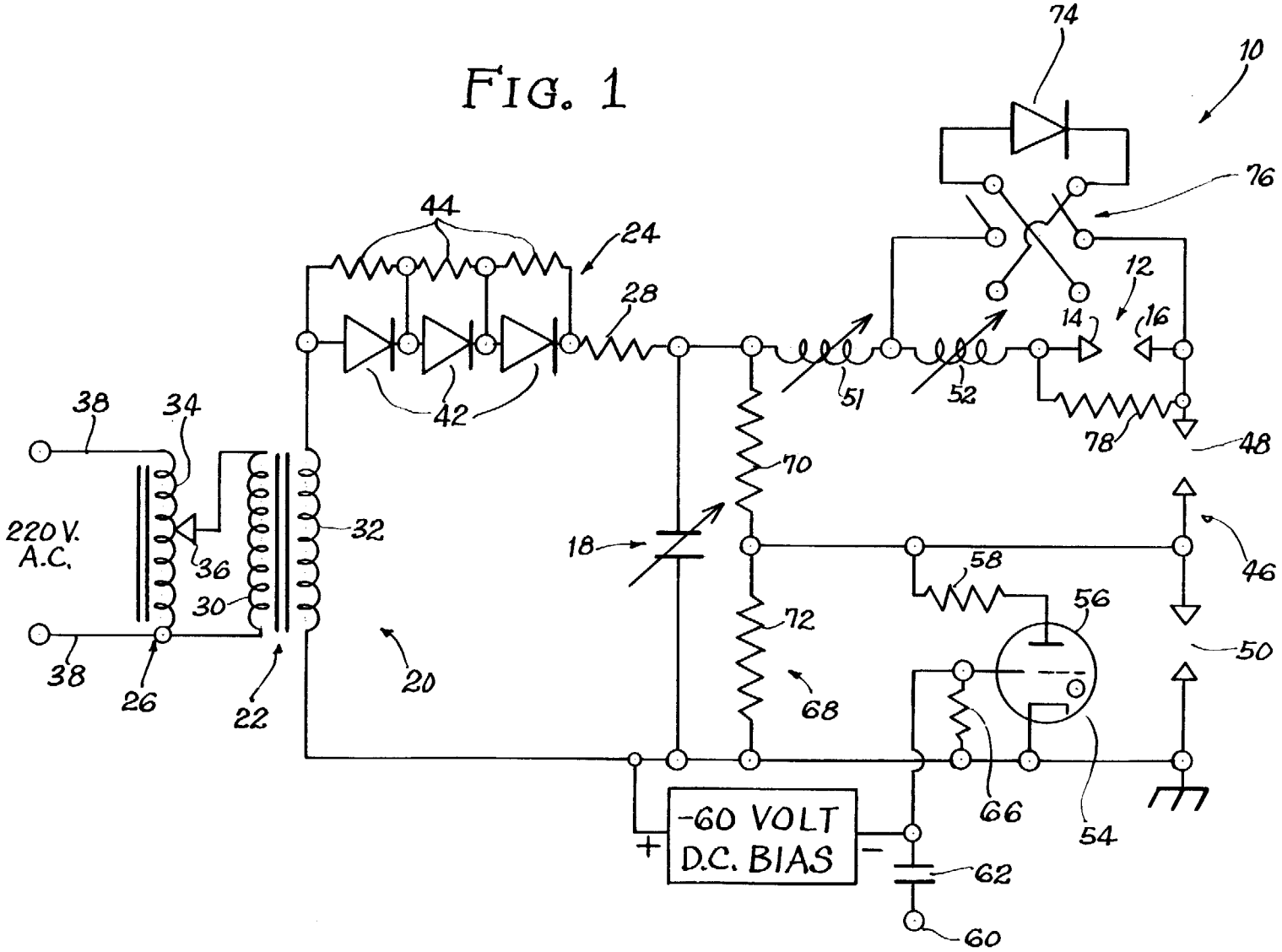

As already indicated, FIG. 1 is a schematic wiring diagram of a spark source 10, which will find various applications but is particularly advantageous as a light source for use in making spectroscopic analyses. The light source 10 comprises an analytical spark gap 12 into which the material to be analyzed is to be introduced. It will be seen that the spark gap 12 comprises spaced electrodes 14 and 16. The material to be analyzed may be placed on one or both of the electrodes 14 and 16; or it may constitute one of the electrodes or exist as a gas between the electrodes.

The analytical sparks are produced by discharging a capacitor 18 across the spark gap 12. The capacitor 18 is adapted to store an electrical charge at a high voltage. The abrupt discharge of the capacitor 18 across the spark gap 12 produces a discharge current of great magnitude, so that some of the material to be analyzed is vaporized and ionized. Accordingly, the spark produces light containing the optical emission spectra of the various constituents contained in the material being analyzed.

The capacitor 18 is preferably arranged so that its capacitance is variable or adjustable. As will be understood by those skilled in the art, this may be achieved by subdividing the capacitor 18 into various capacitive elements and providing a switching arrangement or other means whereby the various capacitive elements can be selectively connected into the circuit. Variable capacitor elements may also be employed.

Means are provided to charge the capacitor 18 to a high voltage. For this purpose, the illustrated apparatus 10 comprises a charging circuit 20 which utilizes a transformer 22 and a rectifier 24, together with a variable regulating transformer 26 and a current limiting impedance 28. The transformer 22 is of the step-up type having primary and secondary windings 30 and 32. The regulating transformer 26 supplies the primary winding 30 with an alternating voltage of variable magnitude. In this case, the regulating transformer 26 is of the autotransformer type comprising a single winding 34 having an adjustable tap 36. The winding 34 is connected across a pair of input line conductors 38 supplied with alternating current at 220 volts and 60-cycles, or any other suitable voltage and frequency.

The primary winding 30 of the step-up transformer 32 is connected between the adjustable tap 36 and one of the power lines 38. Thus, the voltage developed by the secondary winding 32 may be changed by adjusting the tap 36 on the regulating transformer 26.

Because of the high voltage involved, the rectifier 24 preferably comprises a stack or series of diode rectifiers 42. Voltage equalizing resistors 44 of high value are preferably shunted across the diodes 42.

The rectifier assembly 24 and the current limiting impedance 28 are connected between the transformer 32 and the capacitor 18 so that the capacitor 18 is charged through the rectifier assembly 24 and the impedance element 28. The impedance element 28 may simply take the form of a resistor which limits the peak charging current through the rectifier diodes 42. It will be understood that the alternating current supplied by the transformer secondary 32 is rectified by the rectifier assembly 24 so that the capacitor 18 is charged to a high direct voltage.

The storage capacitor 18 and the analytical spark gap 12 are connected into a discharge circuit 46, whereby the capacitor is discharged across the spark gap 12. To provide a switching action, the illustrated discharge circuit 46 comprises one or more control spark gaps which are employed to control the spark discharge across the main analytical gap 12. As shown, the discharge circuit 46 comprises two control spark gaps 48 and 50.

The discharge current across the analytical spark gap 12 is normally oscillatory, because of the presence of capacitance and inductance in the discharge circuit. To regulate and control the oscillatory character of the discharge current, it is preferred to provide first and second inductive or reactive elements 51 and 52 in the discharge circuit 46. It will be seen that the reactive elements 51 and 52 are connected in series with the analytical spark gap 12. In the illustrated arrangement, the reactive elements 51 and 52 are predominantly inductive, and hence will be sometimes referred to as inductive elements. However, it will be understood that the reactive elements 51 and 52 include components of capacitive reactance and resistance, as well as the predominant inductive reactance. The reactive or inductive elements 51 and 52 may comprise separate inductance coils, or may be combined into a single coil with a tap between the two inductive elements. Preferably, at least one of the inductive elements 51 and 52 is variable or adjustable in inductance. As shown, both inductive elements 51 and 52 are adjustable. This adjustability may be achieved in any known or suitable manner. Thus, each of the inductive elements 51 and 52 may be in the form of a variable inductor of any known or suitable construction. The variable inductors may utilize movable coils, movable taps or movable cores. The adjustability of the inductive elements may also be achieved by providing a plurality of taps and a switching arrangement. Plug-in or interchangeable inductive elements of various values may also be employed to achieve the desired adjustability.

In the illustrated discharge circuit 46 the control spark gaps 48 and 50 are connected in series with the main analytical spark gap 12. The control spark gaps 48 and 50 may be adjustable to control the distribution of the voltage.

In the illustrated arrangement, the discharge of the capacitor 18 is initiated by connecting a switching device 54 across one of the control spark gaps, in this case the gap 50. The shunting of the control gap 50 increases the voltage across the gaps 12 and 48 so that the spark discharge is initiated.

The switching device 54 is preferably of the electronic type, illustrated as a Thyratron or other arc discharge tube 56. It will be seen that the anode and the cathode of the tube 56 are connected across the control spark gap 50, a current limiting resistor 58 being connected in series with the anode. The control electrode of the tube 56 is connected to an input terminal 60 through a coupling capacitor 62. The tube 56 is triggered into a conductive state by applying a positive pulse to the input terminal 60, relative to the cathode, which is grounded. The tube 56 is initially maintained in a nonconductive state by a negative biasing voltage, applied to the control electrode by a bias supply 64. A return resistor 66 of high value is preferably connected between the control electrode and the cathode of the tube 56.

The initial voltage across the control gap 50 is preferably established by a voltage divider 68 comprising resistors 70 and 72 connected across the capacitor 18. The control gap 50 is connected across the resistor 72. When the arc discharge tube 56 is triggered into a conductive state, the control spark gap 50 is virtually short-circuited, inasmuch as the shunt path through the tube 56 and the resistor 58 has a very low resistance. Thus, virtually the entire capacitor voltage 18 is applied across the spark gaps 12 and 48, which are adjusted so that these gaps will break down to initiate the spark discharge.

To modify the waveform of the discharge current across the analytical spark gap 12, it is preferred to provide a diode rectifier 74 adapted to be shunted across the series combination of the analytical spark gap 12 and the second inductive element 52. It is preferred to provide means whereby the polarity of the diode rectifier 74 can be reversed. As shown, such means take the form of a reversing switch 76. Normally, the diode rectifier 74 is polarized so that it is initially nonconductive. Thus, the initial high voltage across the analytical spark gap 12 is applied inversely to the diode 74. To aid in discharging capacitor 18, a resistor 78 of high value is preferably shunted across the analytical spark gap 12. It will be evident that the diode 74 must be capable of withstanding the entire voltage developed across the capacitor 18. To provide the necessary voltage rating, the diode rectifier 74 may actually comprise a stack or series of individual diodes.

When the capacitor 18 is discharged across the spark gaps 12 and 48, the discharge current tends to be oscillatory, because of the presence of both capacitance and inductance in the discharge circuit. The oscillatory character of the discharge is clearly illustrated in the oscillograms of FIG. 5, which represent the waveform of the analytical spark gap current for various values of the inductive elements 51 and 52. It will be seen that the oscillatory discharge is damped in that the alternating pulses decay or decline in magnitude with the passage of time.

The pulses of the discharge current alternate in polarity, so that the odd numbered pulses are of one polarity, while the even numbered pulses are of the opposite polarity. The diode 74 is normally polarized in a direction opposite to the initial current pulse or surge. Thus, the diode does not have any substantial shunting effect upon the initial pulse. The same is true of the odd numbered pulses which have the same polarity as the initial pulse. However, the shunting effect of the diode 74 tends to attenuate the second pulse and the other even numbered pulses.

Figure 5:
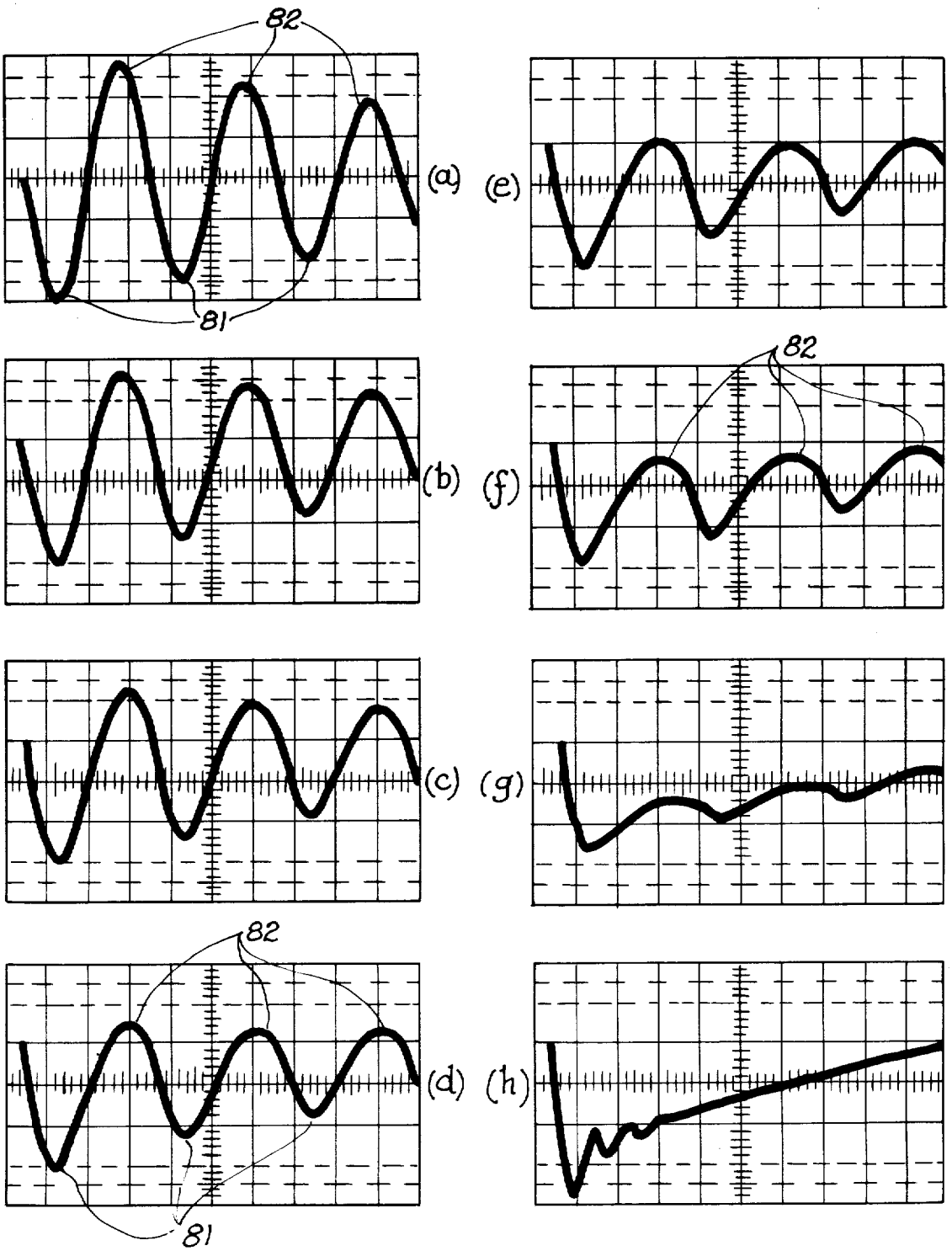

By adjusting the first and second inductive elements 51 and 52, particularly the second inductive element 52, the shunting effect of the diode can be greatly changed, so that the waveform of the spark gap current can be varied over a wide range. This is graphically illustrated by the successive oscillograms of FIG. 5. FIG. 5(a) represents the spark gap current when the value of the second inductive element 52 is essentially zero. For this condition, the diode has no appreciable effect upon the waveform. FIGS. 5(b), (c), (d), (e), (f) and (g) represent the spark gap current for successively increased values of the second inductive element 52. It will be seen that the shunting effect of the diode 74 becomes progressively more pronounced. While the first and other odd numbered pulses 81 are relatively unaffected, the second and other even numbered pulses 82 are progressively attenuated. In the oscillograms of FIGS. 5(f) and (g), the shunting effect of the diode 74 is so pronounced that the polarity of the even numbered pulses 82 is reversed. In the condition represented by the oscillogram of FIG. 5(h), the value of the first inductive element 51 has been decreased. This change increases the basic frequency of the oscillatory discharge current, while also increasing the shunting effect of the diode.

The following table gives illustrative values of the inductive elements 51 and 52 for the oscillograms of FIGS. 5(a)–(h).

| | Inductances in microhenrys | |
|---|---|---|
| FIG. | L 51 | L 52 |
| 5(a) | 150 | 0 (residual) |
| 5(b) | 150 | 0.8 |
| 5(c) | 150 | 2.4 |
| 5(d) | 150 | 5.6 |
| 5(e) | 150 | 8.8 |
| 5(f) | 150 | 12.0 |
| 5(g) | 150 | 16.0 |
| 5(h) | 16.0 | |

Illustrative values of the other components shown in FIG. 1 are as follows:

| | | |
|---|---|---|
| Transformer | 22 | 23 KV. rms. |
| Rectifier | 24 | RCA CR-110 |
| Rectifier | 74 | Westinghouse #1-18M-lH/441B-D |
| Tube | 56 | RCA 5563-A |
| Capacitor | 18 | 0.0625 microfarad, 20 KV. |
| Capacitor | 62 | 1 microfarad, 600 v. AC |
| Resistors: | 28 | 1500 ohms, 200 W. |
| | 44 | 20 megohms, 5 W. |
| | 58 | 50 K, 100 W. |

-continued

| | | |
|---|---|---|
| | 66 | 47 K, 1 W. |
| | 70 | 20 megohms, 5 W. |
| | 72 | 20 megohms, 5 W. |
| | 78 | 1 megohm, 5 W. |
| Inductor | 51 | Self-inductance, 0–300 microhenrys |
| | 52 | Self-inductance, 0–16 microhenrys |

Those skilled in the art will understand that the values of the various components can be varied widely, to suit various conditions.

Figure 2:
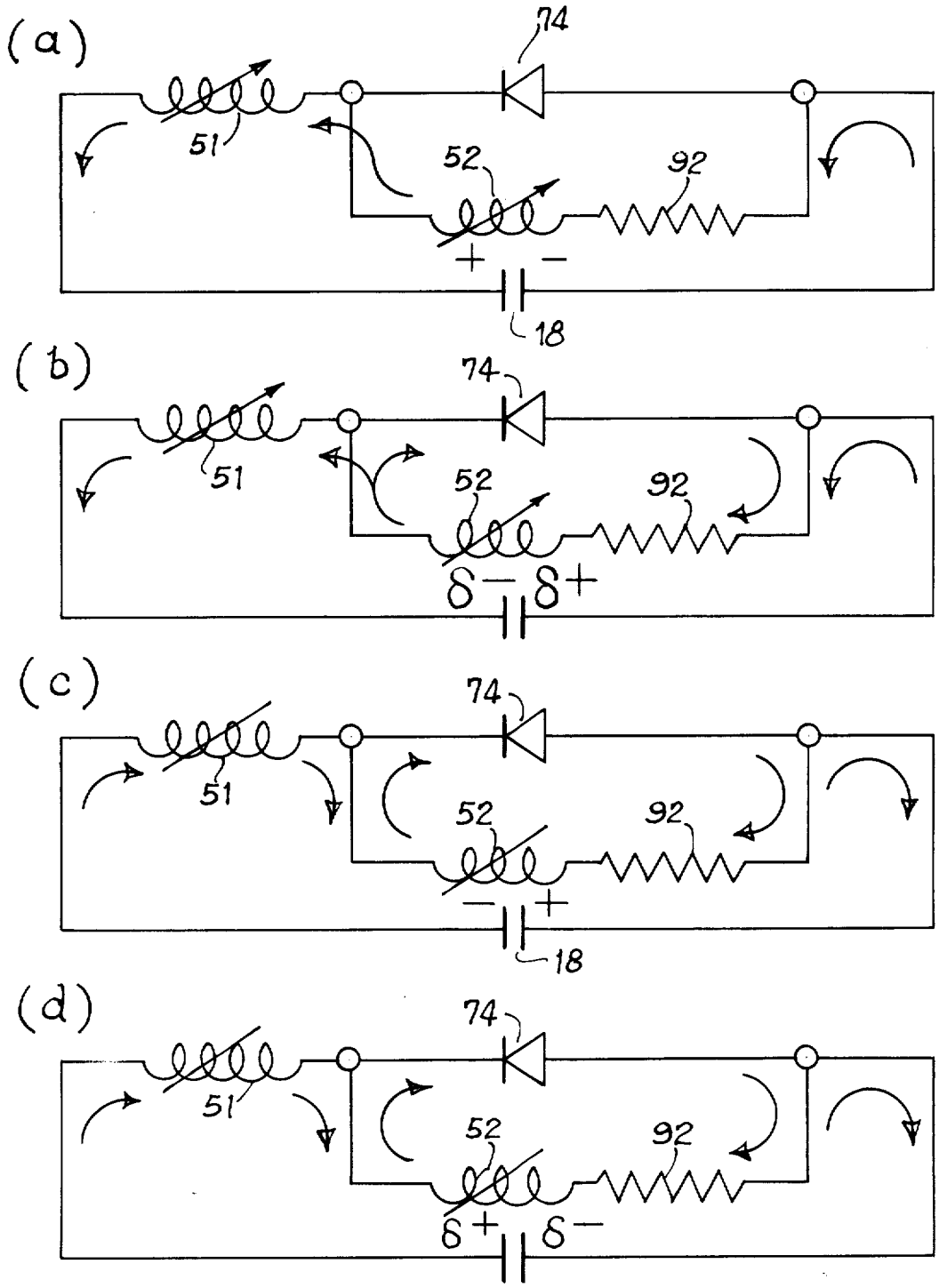

FIG. 2 illustrates the shunting action of the diode in various stages of the oscillatory discharge. In the diagrams of FIG. 2, the effective or dynamic impedance of the analytical spark gap 12 is represented by a resistor 92. The other components shown in FIG. 2 are the same as in FIG. 1. These components comprise the capacitor 18, the first and second inductive elements 51 and 52, and the diode 74.

FIG. 2 is a qualitative representation of the wave shaping action of the diode 74 and the inductive elements 51 and 52. In FIG. 2(a) the discharge has been triggered and the first quarter cycle of the discharge current is in progress. The discharge current flows through the spark gap impedance 92 and the inductance 52 because the diode 74 is reverse biased and is nonconductive. This current flow is indicated by the arrows in FIG. 2(a). During the time interval represented by FIG. 2(a), the first peak current of the oscillatory discharge appears in the spark gap impedance 92. The diode 74 sustains a reverse bias until the current peaks, because the potential drop across the diode is determined by the inductance 52 in series with the spark gap impedence 92.

In FIG. 2(b), the current has peaked and the capacitor voltage is just beginning to reverse. At approximately this time, the diode 74 goes into a forward biased condition, because the decreasing current produces an induced voltage of reverse polarity in the inductance 52. The forward bias establishes the current shunt path through the diode 74. The point in time with respect to the main oscillatory current at which the diode 74 sustains a forward bias depends upon the phase angle of the voltage drop across the diode, relative to the oscillatory current. Due to the inductive reactance of the inductive element 52, the voltage drop across the diode 74 leads the discharge current by a phase angle which increases as the inductance of the element 52 is increased. This angle approaches 90° when the inductive reactance is increased so that it greatly exceeds the dynamic impedence 92 of the spark gap. Inasmuch as a typical spark gap impedence may be only about 2 ohms, the inductive reactance of the element 52 does not have to be very great to produce a phase angle approaching 90°. Thus, the voltage drop across the diode 74 reverses in polarity to produce a forward bias, shortly after the peak of the discharge current.

After the diode 74 is in a forward biased condition so as to be conductive, the bias is current controlled and is determined largely by the voltage drop across the forward impedence of the diode itself. The forward impedence of the diode is generally substantially lower than the impedence of the inductance 52 and the dynamic spark gap impedence 92. The diode impedence is substantially resistive, so that the forward bias is in phase with the current through the diode. As long as the forward current is sustained through the diode 74, it continues to be conductive. Thus, there are two distinct biasing regions for the diode 74 with respect to the main discharge current. The first biasing region controls the turn-on of the diode. In this region, the biasing voltage assumes a leading phase angle with respect to the discharge current, as determined by the inductive impedence of the inductive element 52 in series with the spark gap impedence 92. The second biasing region controls the diode turn-off. The turn-off point is not reached as long as the forward biasing current is maintained. After the diode has been turned on, the forward biasing current is initially maintained by the relaxation of the inductance 52, which produces a loop current through the diode 74, the spark gap impedence 92 and the inductance 52, as indicated by the arrows in FIG. 2(b). This loop current is due to the voltage induced in the inductance 52 by the decreasing discharge current through the inductance. The loop current tends to sustain and prolong the initial discharge current through the spark gap impedence 92. During this interval, prior to the reversal of the main oscillatory discharge current, the only current in the diode 74 is due to the field relaxation in the inductance 52, because the main discharge current is still in a direction that would cause reverse bias in the diode 74.

FIG. 2(c) illustrates the condition after the reversal of the main oscillatory discharge current, due to the reverse discharge of the capacitor 18. The main discharge current is now in a direction to cause forward bias in the diode 74. Thus, the main discharge current combines with the loop current to sustain the forward bias of the diode 74. This situation continues during the entire second half cycle of the main dishcarge current, because the main discharge current continues to flow in a direction such as to sustain the forward bias. Thus, the diode 74 is turned on slightly after the peak of the first half cycle of the main discharge current, and is maintained in a conductive state until completion of the entire first current cycle. When the diode is conductive, the spark gap current is modified by the loop current, due to the relaxation of the inductance 52. During the second half cycle of the main discharge current, the spark gap current is substantially attenuated by the bypassing of the current through the conductive diode.

It will be evident from this discussion that the second half cycle of the current through the spark gap can be varied over a wide range by adjusting the value of the inductance 52. This changes the inductive reactance of the element 52 and varies the extent to which the main discharge current is bypassed by the diode 74. Moreover, the variation of the inductance of the element 52 changes the turn-on point of the diode 74 to some extent.

Figure 3:
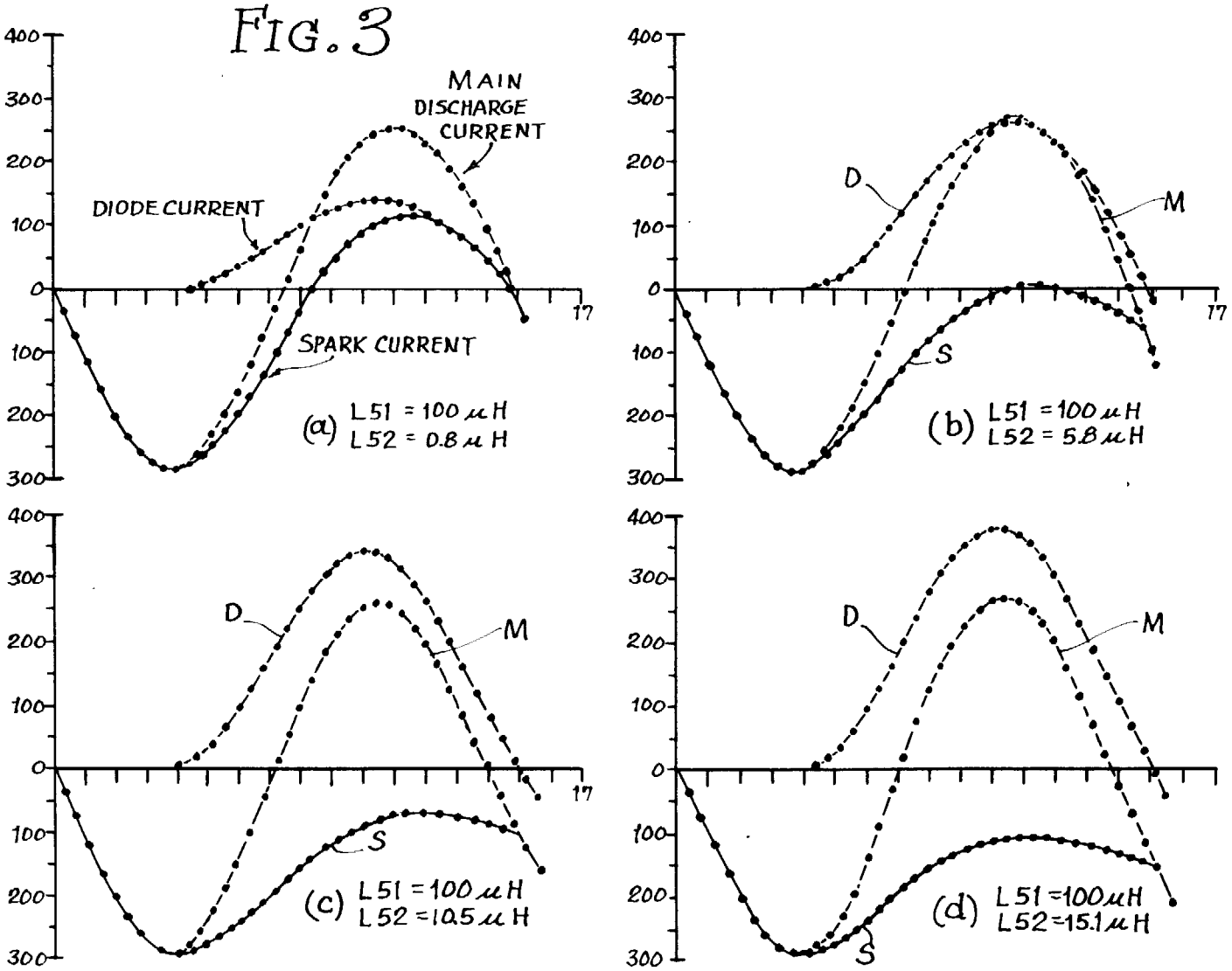

FIG. 3 comprises a series of graphs, showing the manner in which the waveform of the spark current may be changed by adjusting the value of the shunted inductance 52. These graphs show the waveforms of the main discharge current, the diode current, and the spark current. The four graphs of FIG. 3 are drawn for four different values of the shunted inductance 52, but the unshunted inductance is held constant at 100 microhenrys. The values of the shunted inductance 52 for the conditions represented by these graphs are as follows:

| | |
|---|---|
| FIG. 3(a) | 0.8 microhenrys |
| 3(b) | 5.8 microhenrys |
| 3(c) | 10.5 microhenrys |

-continued

| | |
|---|---|
| 3(d) | 15.1 microhenrys |

As already indicated, the main discharge current has a typical damped oscillatory waveform in all four cases. As already discussed, the diode becomes conductive shortly after the first peak of the main discharge current, at the end of the first quarter cycle, and the diode current continues throughout the remainder of the complete cycle. The diode current rises to a peak and then declines to zero, shortly after the beginning of the second complete cycle of the main discharge current. The spark current is the algebraic difference between the main discharge current and the diode current.

It will be clearly evident from FIG. 3 that the peak diode current increases with the increasing values of the shunted inductance 52. This is due to two factors: increased loop current and the increased bypassing effect of the diode with the increasing shunted inductance.

It will be seen that the peak of the diode current coincides roughly with, but is somewhat ahead of the second peak of the main discharge current. For relatively low values of the shunted inductance, the peak diode current is less than the second peak of the main discharge current, as shown in FIGS. 3(a) and (b). The second peak of the spark current is diminished or attenuated, relative to the main discharge current, due to the subtraction of the diode current therefrom, but the second peak of the spark current is still of unchanged polarity, despite the shunting effect of the diode. For larger values of the shunted inductance, as represented by FIGS. 3(c) and (d), the peak diode current actually exceeds the second peak of the main discharge current, so that the second peak of the spark current is reversed in polarity, relative to the main discharge current. Thus, the higher values of the shunted inductance result in a spark current waveform which is unidirectional, in that there is no change of polarity between the first and second peaks. This effect is clearly evident in FIGS. 3(c) and (d).

It is worthy of note that the changes in the shunted inductance 52 do not appreciably change the magnitude of the first peak of the spark current. This is due to the fact that the diode 74 does not start to conduct until the first peak is reached, or shortly thereafter. The magnitude of the first peak is determined primarily by the values of the storage capacitor 18 and the total inductance in the discharge circuit. The unshunted inductance 51 is usually much larger than the shunted inductance 52, and thus is the dominant factor in determining the first peak current. Increasing the value of the capacitor increases the first peak current. On the other hand, the first peak current is decreased by increasing the total inductance in the discharge circuit.

Figure 4:
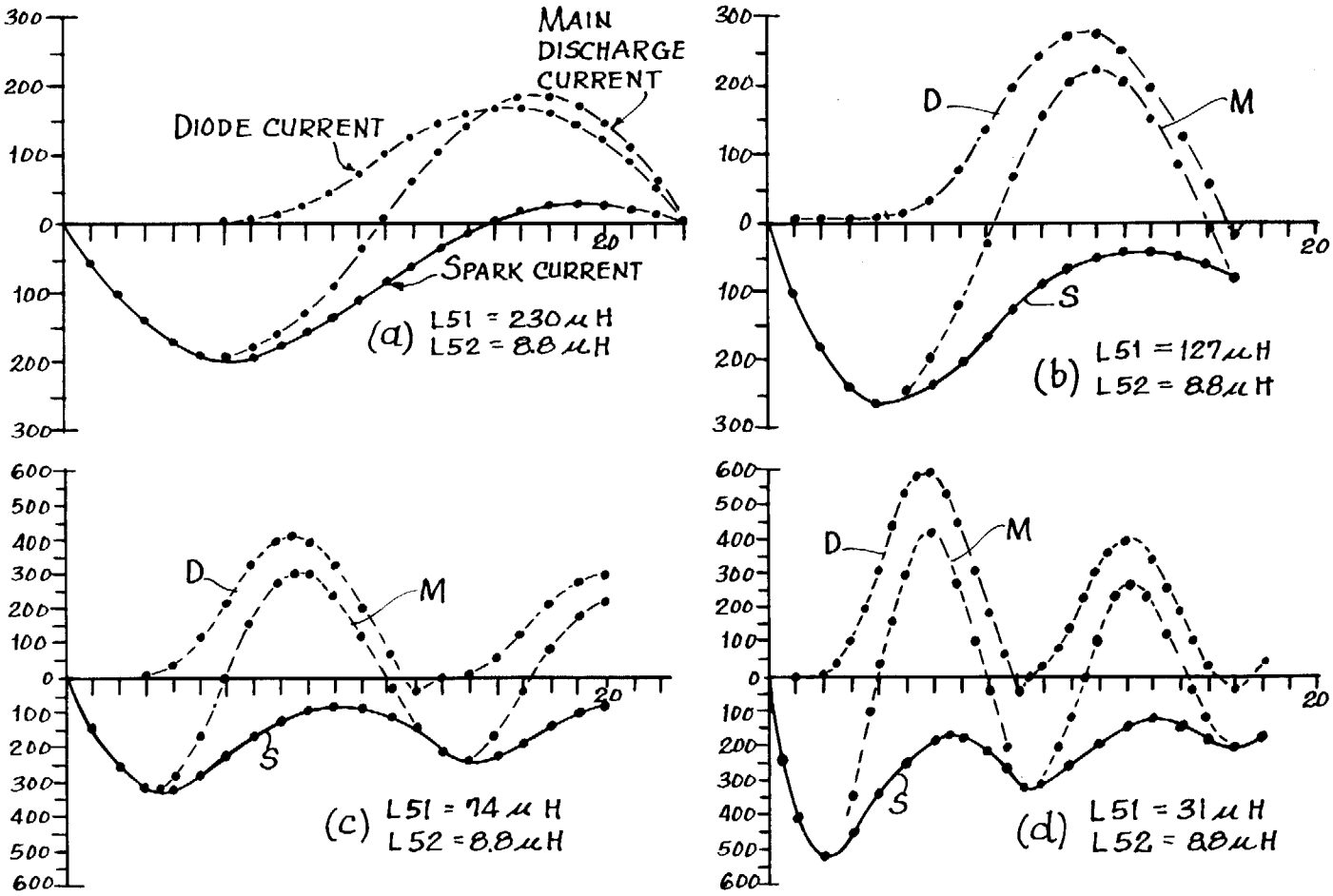

The graphs of FIG. 4 illustrate the effect of varying the unshunted inductance 51, while keeping the shunted inductance 52 at a constant value. Here again, the waveforms of the main discharge current, the diode current and the spark current are shown. The shunted inductance 52 is held constant at 8.8 microhenrys. The values of the unshunted inductance 51 are as follows:

| | |
|---|---|
| FIG. 4(a) | 230 microhenrys |
| 4(b) | 127 microhenrys |
| 4(c) | 74 microhenrys |

-continued

| | |
|---|---|
| 4(d) | 31 microhenrys |

It will be seen that the first peak of the main discharge current is increased by decreasing the unshunted inductance 51. At the same time, the frequency of the oscillatory discharge current is increased.

The peak diode current also increases when the unshunted inductance is decreased. This is due to two factors: The increased first peak of the main discharge current, which increases the loop current due to relaxation of the shunted inductance; and the increased inductive reactance of the shunted inductance, due to the increased frequency of the main discharge current. The second factor increases the bypassing action of the diode.

In the situation represented by FIG. 4(a), the second peak of the spark current is decreased in amplitude from that of the main discharge current, but the polarity is the same. In the situations represented by FIGS. 4(b), (c) and (d), the diode current is so great that the second peak of the spark current is reversed in polarity relative to the main discharge current. Thus, the spark currents of FIGS. 4(b), (c) and (d) are unidirectional.

Figure 6:
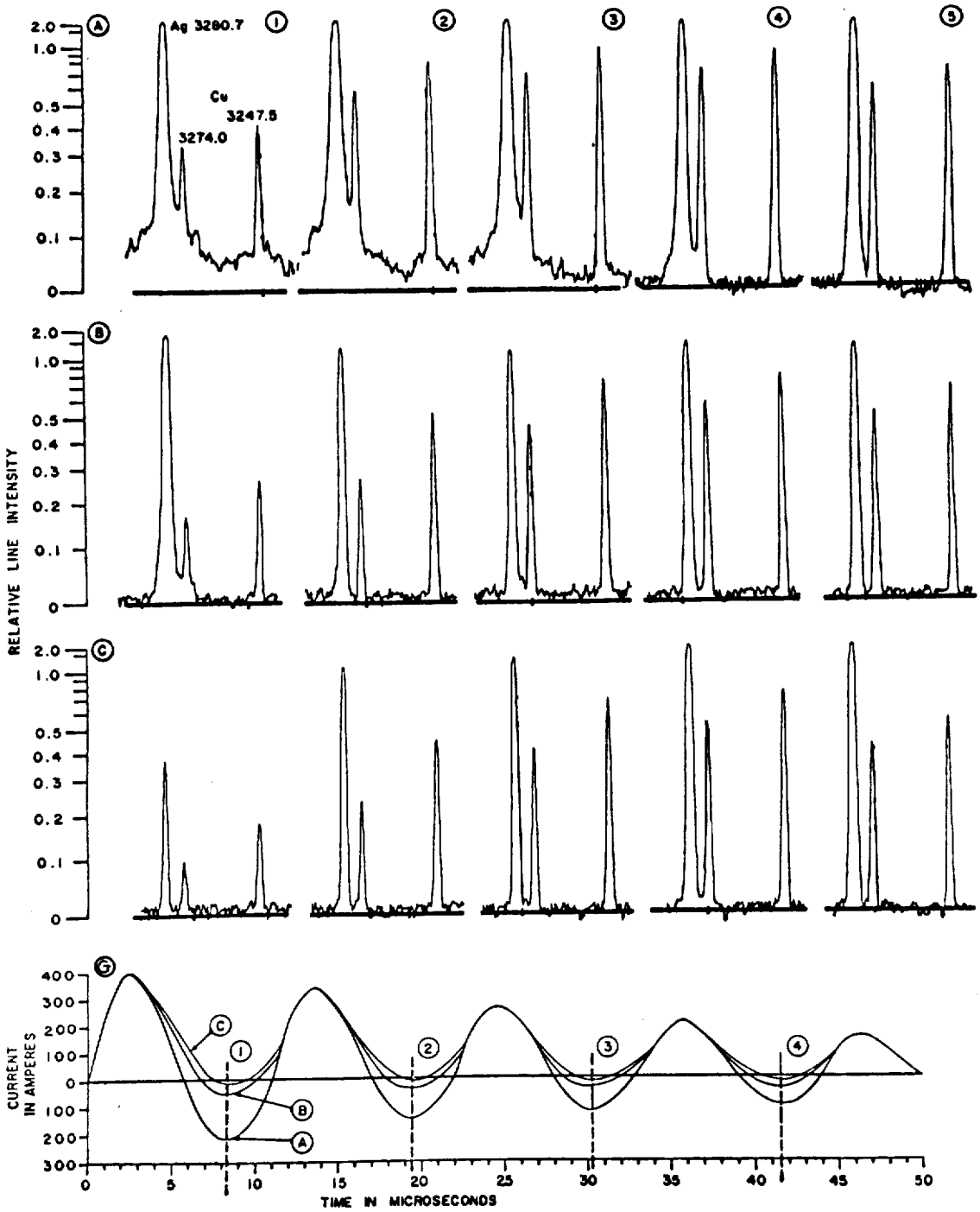

In making certain types of spectrograms it is a great advantage to vary the waveform of the spark current, in the manner made possible by the present invention. The graphs of FIGS. 6 and 7 were made from certain spectrograms of the spectra produced by an aluminum alloy with a copper impurity. In making these spectrograms, the analytical spark gap 12 comprised an anode made of silver and a cathode made of the aluminum alloy with the copper impurity. FIGS. 6A, B and C and FIGS. 7D, E and F are graphs representing the relative line intensities of certain closely spaced spectra lines. As noted in FIGS. 6 and 7, one of the lines was produced by the silver in the anode, and the other two lines were produced by the copper impurity in the cathode.

FIGS. 6G and 7H are graphs showing the waveforms of the spark currents, employed in making the six sets of spectrograms. It will be understood that the spectral graphs of FIGS. 6A, B and C were made with the spark waveforms designated A, B and C in FIG. 6G. Waveform A was produced by using a low value of shunted inductance, while waveforms B and C were produced with higher values. Thus, the second peak of the spark current in waveform A is attenuated very little, while the second peaks in waveforms B and C are more severely attenuated. This also applies to the other even numbered peaks. In these waveforms, the shunting action of the diode is not so great as to cause reversal of the polarity of the even numbered peaks.

FIG. 6A comprises five graphs of time resolved spectrograms made at the first five even numbered peaks of the spark current. The first four of these instants of time are marked by the numerals 1–4 in FIG. 6G.

It will be seen that the spectrographs of FIG. 6A show high background levels, and relatively poor resolution of the closely spaced lines, particularly the silver line at 3280.7 angstroms and the copper line at 3274.0 angstroms. For the spectral graphs of FIG. 6B, the background is decreased and the resolution is improved. FIG. 6C also represents a highly favorable situation in this regard. Thus, it is highly advantageous to use the modified waveforms represented by graphs B and C in FIG. 6G. For spectro-chemical uses, the low background produces the advantage of a high signal to noise ratio.

Figure 7:
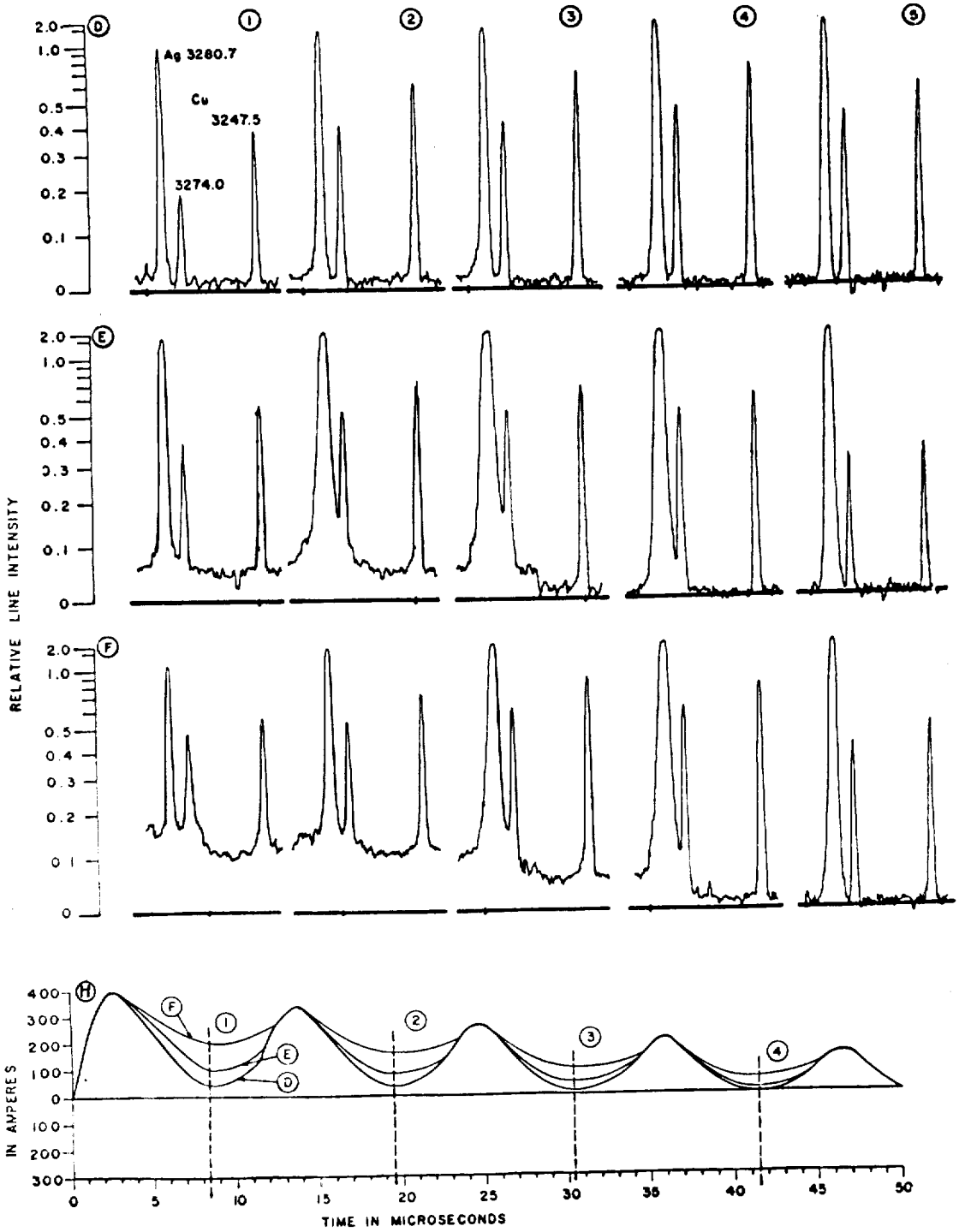

FIG. 7 represents the situation with still higher values of shunted inductance. The spark waveforms are shown in FIG. 7H and are designated D, E and F. The spectrographs of FIGS. 7D, E and F were derived from spectrograms made with these spark waveforms. In these three cases, the shunted inductance was so high that polarity reversal was produced for the even numbered peaks of the spark current. This is clearly evident in FIG. 7H.

FIGS. 7D, E and F represent the same spectral lines as in FIGS. 6A, B and C. It will be seen that FIG. 7D represents a fairly favorable situation, with a fairly low background and good resolution of the spectral lines. However, the background is greatly increased in FIGS. 7E and F, while the resolution is not as good as in FIG. 7D.

It will be evident from FIGS. 6 and 7 that the best spectrograms are obtained when the pulses of spark current are small in magnitude and brief in duration. Such relatively small spark currents minimize the spectral background and improve the resolution of the closely spaced spectral lines. Such relatively small spark currents are in the ordinary arc discharge range. Higher spark currents overexcite the ions and produce more complex spectra, resulting in high background.

Nevertheless, it is a distinct advantage to retain the high spark currents in the first pulse and the other odd numbered pulses of the spark current. These high currents result in very rapid vaporization of the material to be analyzed, so that the spark gap is kept full of the vaporized material. The high concentration of the material to be analyzed results in better spectrograms, particularly when it is necessary to make accurate measurements of an impurity or other constituent which is present in only a very small percentagte. The spectralgraphs of FIGS. 6 and 7 represent a situation of this kind, in which the copper is present in the aluminum alloy as an impurity in a proportion of only about 1 percent.

As already indicated, the first peak of the spark current can be increased by decreasing the value of the unshunted inductance 51. This would normally increase the frequency of the main discharge current, but the value of the capacitor 18 can be increased to compensate for the decrease in the unshunted inductance, so that the frequency will remain constant.

The present invention is highly advantageous in that the waveform of the spark current can be changed over a wide range, simply by adjusting the inductance of one coil. The apparatus of the present invention is highly versatile, yet highly economical.

Figure 8:
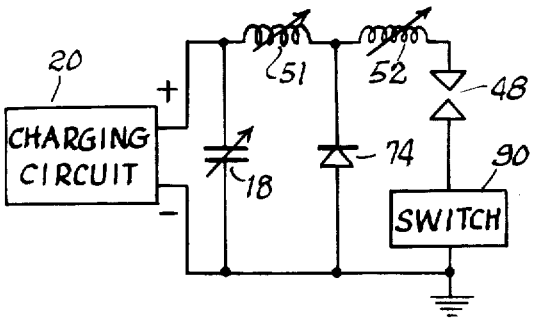
FIG. 8 is a schematic circuit diagram showing a simplified version of the spark source shown in FIG. 1.

FIG. 8 represents a simplified and somewhat modified spark source which is generally very similar to the spark source of FIG. 1. Thus, the capacitor 18 is adapted to be charged by the charging circuit 20, and is adapted to be discharged through the series circuit comprising the inductance coils 51 and 52 and the spark gap 48. A switch 90 is also connected into this series circuit, for the purpose of initiating the discharge of the capacitor 18 across the spark gap 48. The switch 90 may comprise various switching means, such as the switching arrangement of FIG. 1, utilizing the control spark gaps 48 and 50 and the electronic switch 54. Various other electronic switching arrangements may be employed. The switch 90 may also simply comprise a mechanically operable switch. Normally, the switch 90 is adapted to be operated repetitively so that a series of sparks is produced. Thus, the switch 90 may be rotary or vibratory in operation. However, it generally is preferable to employ a suitable electronic switch.

The spark source of FIG. 8 also includes the rectifier 74, which is connected in the same manner as in FIG. 1, so that the rectifier is shunted across the portion of the circuit comprising the spark gap 48 and the second inductance coil 52. As shown in FIG. 8, this portion of the circuit also includes the switching means 90. In FIG. 8, the reversing switch 76 has been omitted, but it will be understood that the polarity of the rectifier 74 can be reversed, if desired.

While the inductance coils 51 and 52 are predominantly inductive in reactance, these components should be regarded generally as reactive elements or impedances, having inductive, capacitive and resistive components. This concept is illustrated to better advantage in FIG. 9, in which the first reactive element 51 is illustrated as comprising inductive, capacitive and resistive components 91, 92, and 93. Similarly, the second reactive element 52 is illustrated as comprising inductive, capacitive and resistive components 94, 95 and 96. These components will inherently be present to some degree in the reactive elements 51 and 52. It will be understood that additional capacitive reactance, inductive reactance or resistance can be provided in the form of lumped components, if desired. Inductive reactance generally predominates in the reactive elements 51 and 52, but in some cases the capacitive reactance or the resistance may predominate.

Figure 10:
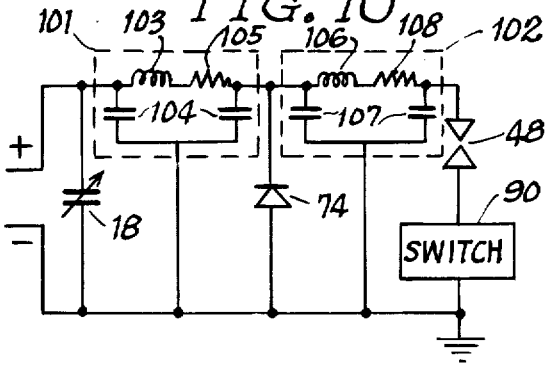
FIG. 10 is a circuit diagram of a modified spark source.

FIG. 10 illustrates a spark source which is the same as shown in FIG. 8, except that the inductance coils 51 and 52 are replaced by transmission lines 101 and 102. For example, such transmission lines may be in the form of lengths of coaxial cable. The line 101 is represented as including inductive, capacitive and resistive elements 103, 104, and 105. Similarly, the line 102 is represented as comprising inductive, capacitive and resistive components 106, 107 and 108. The inductive reactance generally predominates in each of the transmission lines 101 and 102. It has been found that the transmission lines produce interesting and useful modifications in the waveform of the spark discharge current. Generally, the transmission lines introduce stepped patterns into the waveform, apparently due to reflections travelling along the lines.

Figure 9:
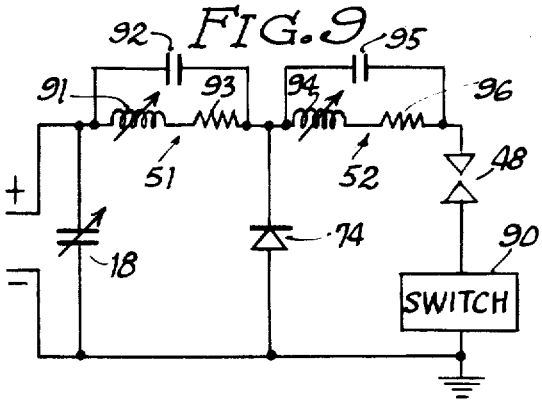
FIG. 9 is a generalized version of the circuit diagrm of FIG. 8.
Figure 11:
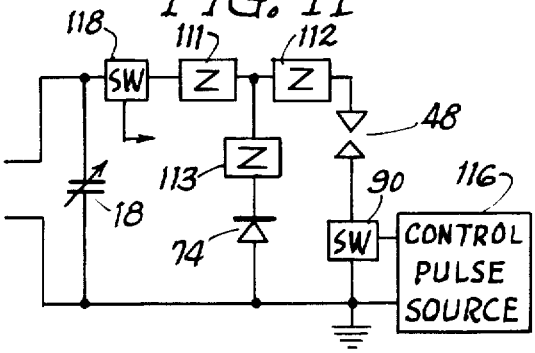
FIG. 11 is a circuit diagram representing a generalized and modified version of the spark source of FIG. 8.

FIG. 11 shows a generalized and modified version of the spark source shown in FIGS. 8 and 9. The reactive elements 51 and 52 are replaced with generalized impedances 111 and 112, which may include inductive, capacitive and resistive components in various proportions. A third impedance 113 is shown directly in series with the rectifier 74. This impedance also modifies the waveform of the spark discharge current. As in the case of the impedances 111 and 112, the impedance 113 is usually arranged so that inductive reactance predominates. However, in some cases the capacitive component or the resistive component could predominate.

In FIG. 11, the switch 90 is the same as discussed in connection with FIG. 8, and is preferably of the electronic type. The switch 90 may be triggered by repetitive pulses from a control pulse source 116.

FIG. 11 also shows an additional switch 118 which illustrates the fact that the switch may be located anywhere in the series circuit between the capacitor 18 and the spark gap 48. The switch 118 may be regarded as being the same in construction as the switch 90. As shown, the switch 118 is located in the series circuit between the capacitor 18 and the first impedance 111.

Figure 12:
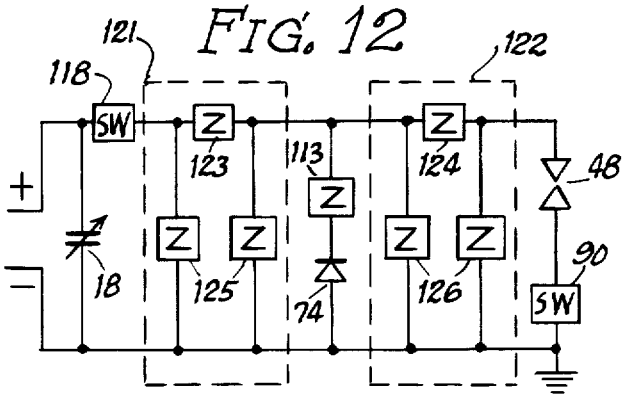
FIG. 12 is a circuit diagram representing a modified and generalized version of the spark source of FIG. 10.

FIG. 12 represents a spark source which constitutes a still further generalization of the spark sources shown in FIGS. 10 and 11. The transmission lines 101 and 102 of FIG. 10 are replaced with complex impedance networks 121 and 122, illustrated as comprising series impedances 123 and 124 and shunt impedances 125 and 126. All of these impedances can be varied to modify the waveform of the spark discharge current.

Figure 13:
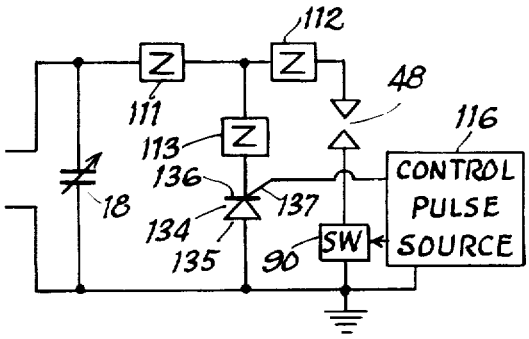
FIG. 13 is a circuit diagram similar to FIG. 11, but showing a modified spark source.

In the spark sources as thus far described, the rectifier 74 is in the form of an ordinary diode, or a series of such diodes. However, the rectifier 74 may be replaced with various other active elements, adapted to cause shunting of the spark gap during a portion of each cycle of the main discharge current. Thus, for example, FIG. 13 illustrates a spark source which is generally the same as illustrated in FIG. 11, except that the rectifier 74 has been replaced with a silicon controlled rectifier (SCR) 134 having an anode 135, a cathode 136 and a gate or control electrode 137. The SCR 134 has a rectifying action, and also is capable of carrying out switching functions, in response to pulses or other signals applied to the gate 137. Thus, the SCR 134 can be controlled so as to be conductive during a variable portion of the cycle. For example, by changing the signals on the gate 137, the conductive portion of the cycle can be progressively reduced.

It is convenient to utilize the control pulse source 116 to provide the control signals for the SCR 134, in addition to providing the control signals for the electronic switch 90. The control pulse source 116 can be arranged so that the interval between conduction of the switch 90 and conduction of the SCR 134 can be varied to change the waveform of the spark current.

Figure 14:
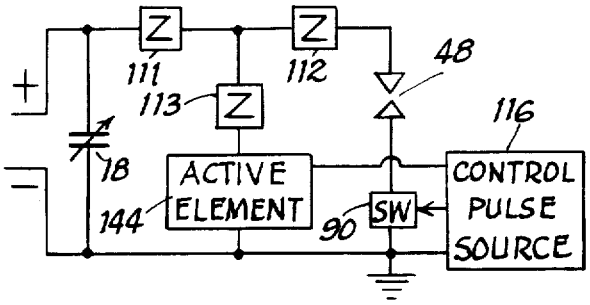
FIG. 14 is a circuit diagram representing a generalized version of FIG. 13.

FIG. 14 illustrates a spark source which is the same as that shown in FIG. 13, except that an active element 144 is shown in place of the SCR 134. Various active elements may be employed, in addition to the SCR, already discussed. Thus, the active element 144 may take the form of a silicon controlled switch, a Triac, an integrated switching circuit, various other solid state switches, or an electron discharge tube, for example. All such active elements are capable of controlling and varying the portion of the cycle during which the spark gap 48 is shunted. It will be understood that the active element 144 may be employed in any of the illustrated spark sources.

As already indicated, the capacitor 18 constitutes means for producing an oscillating or alternating current through the spark gap circuit. The use of such a capacitor is advantageous, because the capacitor is capable of delivering a high peak current. However, other sources of alternating current signals or pulses can be employed.

Figure 15:
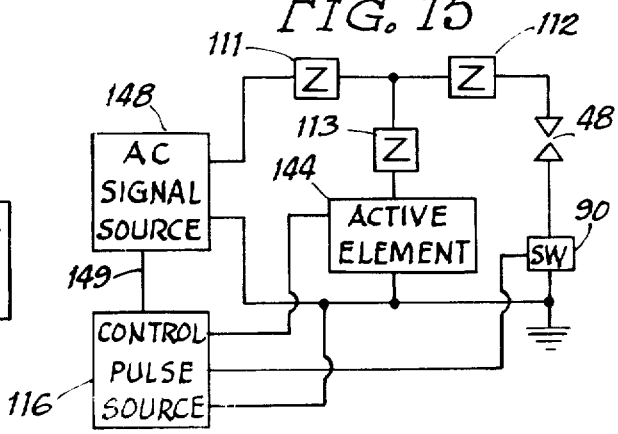
FIG. 15 is a circuit diagram, similar to FIG. 14, but showing a further modification.

Thus, FIG. 15 illustrates a modified spark source, similar to the generalized spark source of FIG. 14, but utilizing an alternating current signal source 148 in place of the capacitor 18..Various types of sources can be employed. For example, the source 148 can be constructed and arranged to develop alternating current signals electronically, usually by electronic switching circuits. The control signals for the electronic switch 90 and the active element 144 should preferably be timed to occur in a suitable relationship to the alternating current signals from the source 148. Thus, a control link 149 is shown between the control pulse source 116 and the alternating current signal source 148. The basic timing can be established by either source 116 or 148. The control link 149 is then utilized to supply timing pulses or signals to the other source. It will be understood that the generalized alternating current source 148 can be employed with any of the disclosed spark sources.

Figure 16:
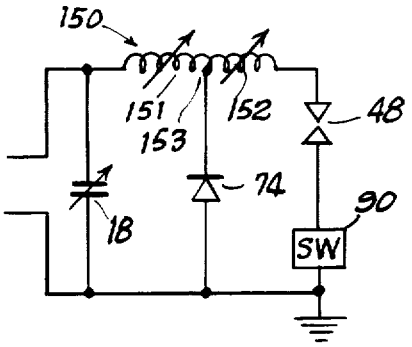
FIG. 16 is a circuit diagram similar to FIG. 8, but showing another modified spark source.

FIG. 16 shows a spark source which is a modified form of the source shown in FIG. 8. As already indicated in connection with the discussion of FIG. 1, the reactive elements 51 and 52 can take the form of a single inductnce coil with a tap thereon. This arrangement is illustrated in FIG. 16, which shows a single inductance coil 150 having portions 151 and 152 which provide the reactive elements. The rectifier 74 is connected to a tap 153 on the coil 150. The tap 153 constitutes the dividing point between the inductive portions 151 and 152. The coil 150 is preferably arranged so that the inductance of the portions 151 and 152 can be changed, as before.

In the spark source of FIG. 16, there is inherent mutual inductance or coupling between the two portions 151 and 152 of the coil 150. This coupling modifies the waveform of the current across the spark gap 148. During the portion of the cycle when the rectifier 74 is conductive, the current along the inductive portion 152 is affected by the current in the inductive portion 151, due to the coupling therebetween.

It will be understood that the coupled inductance elements 151 and 152 of FIG. 16 may be replaced with other coupled reactive elements or impedances. This modification is illustrated in the spark source of FIG. 17, in which the inductance elements 151 and 152 are replaced with impedances 161 and 162 with coupling 163 therebetween. These impedances represent any desired or suitable reactive elements. Another impedance 164 is shown in series with the rectifier 74. The impedance 164 may be present as a separate impedance, or may represent the mutual impedance resulting from the coupling 163. The impedances 161, 162 and 164 may contain inductive and capacitive reactances and also resistance. Coupled transmission lines may be utilized as the impedances 161 and 162, for example.

Figure 17:
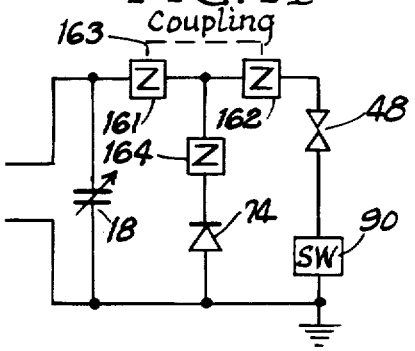
FIG. 17 is a circuit diagram representing a generalized version of FIG. 16.
Figure 18:
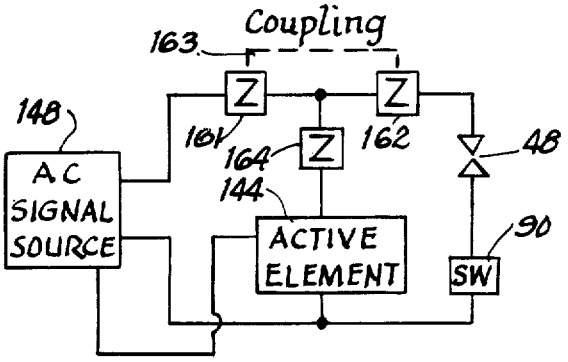
FIG. 18 is a circuit diagram similar to FIG. 17, but showing further modifications.

It will be recognized that the spark source of FIG. 17 is similar to that of FIG. 11, except for the coupling 163 between the impedances 161 and 162. FIG. 18 represents a spark source which is similar to that shown in FIG. 17, except for modifications of the character discussed in connection with FIGS. 13–15. Thus, in the spark source of FIG. 18, the rectifier 74 is replaced with the active element 144, as described in connection with FIG. 14. The capacitor 18 has been replaced with the alternating current signal source 148, as discussed in connection with FIG. 15.

In all of the spark sources disclosed thus far, the spark discharge is initiated or triggered by switching means, represented as a switch 90. The spark gap 48 is broken down by the high voltage to which the capacitor 18 is charged. The switch 90 can be omitted if other means are provided to initiate the spark discharge.

Figure 19:
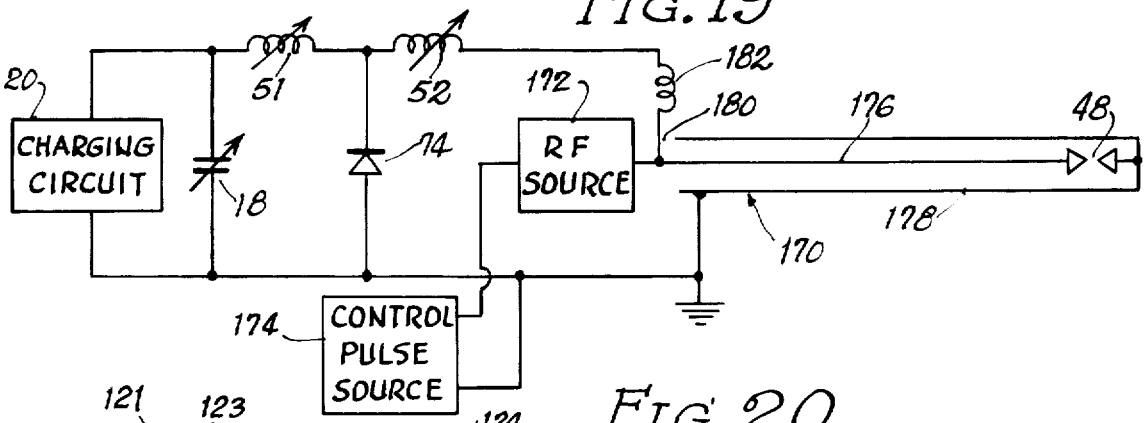
FIG. 19 is a circuit diagram showing another modified spark source in which the spark is ignited by high voltage energy at a radio frequency.

In the spark source of FIG. 19, the spark gap is broken down by a radio-frequency signal at a high voltage. The capacitor 18 is then discharged across the spark gap. With this arrangement, the voltage across the capacitor 18 can be greatly reduced, because the voltage does not have to be great enough to break down the spark gap. The reduced voltage across the capacitor provides much greater flexibility in the selection of reactive elements to be used in the discharge circuit, and also in the selection of the rectifier or someother active element.

In the spark source of FIG. 19, the high voltage at a radio-frequency is developed by a resonant quarter wave line 170 in the manner disclosed and claimed in the co-pending application of John P. Walters and Thomas V. Bruhns, Ser. No. 8,462, filed Feb. 4, 1970. Radio-frequency energy is supplied to the line 170 by a radio-frequency source or generator 172. A suitable frequency is 162 megahertz, but the frequency can be varied over a wide range. The radio-frequency source 172 is adapted to be actuated or triggered by control pulses or signals from a source 174. Each pulse produces a train of radio-frequency signals at a voltage sufficient to break down the spark gap 48.

The illustrated quarter wave line 170 is of the coaxial type, comprising an axial line conductor 176, disposed within a cylindrical outer line conductor 178. The output of the radio-frequency source 172 is connected between one end of the central conductor 176 and the corresponding end of the outer conductor 178. The length of the line 170 is such as to produce quarter wave resonance at the operating frequency. The spark gap 48 is connected between the opposite end of the axial line conductor 176 and the corresponding end of the outer conductor 178. Thus, the remote end of the line 170 is open before the spark gap breaks down. Due to the quarter wave resonance, the sending end of the line 170 affords a low impedance. Thus, the radio-frequency source delivers its output into a low impedance.

In FIG. 19, the arrangement of the capacitor 18, the reactive elements 51 and 52, and the rectifier 74 is the same as in FIG. 8. However, instead of being connected directly to the spark gap 48, the reactive element 52 is connected to the central conductor 176 of the line 170. The outer conductor 178 is connected to the grounded side of the capacitor 18. The connection between the reactive element 52 and the line conductor 176 is by means of the lead 180, connected to the line conductor 176 at the sending end thereof, adjacent the radio-frequency source 172. A small radio-frequency choke coil 182 may be connected in series with the lead 180, to prevent the passage of any substantial radio-frequency current along the lead, but the provision of this choke coil is not always necessary, because of the low radio-frequency voltage which exists at the sending end of the line, due to the low impedance at this point.

By virtue of the quarter wave resonance, the line 170 builds up the radio-frequency voltage so that it is sufficiently great to break down the spark gap 48. When the spark gap becomes conductive, the capacitor 18 is discharged through the reactive elements 51 and 52, the line 170 and the spark gap 48. The shunting action of the rectifier 74 modifies the waveform of the spark current, in much the same manner as discussed in connection with FIG. 1. However, the initial voltage across the capacitor 18 may be much lower than before, with the result that components having a much lower voltage rating can be employed for the rectifier 74 and the reactive elements 51 and 52.

When the spark gap 48 becomes conductive, the quarter wave line 170 reflects an increased impedance to the output of the radio-frequency source 172, so that the source is effectively unloaded or decoupled from the line 170.

Figure 20:
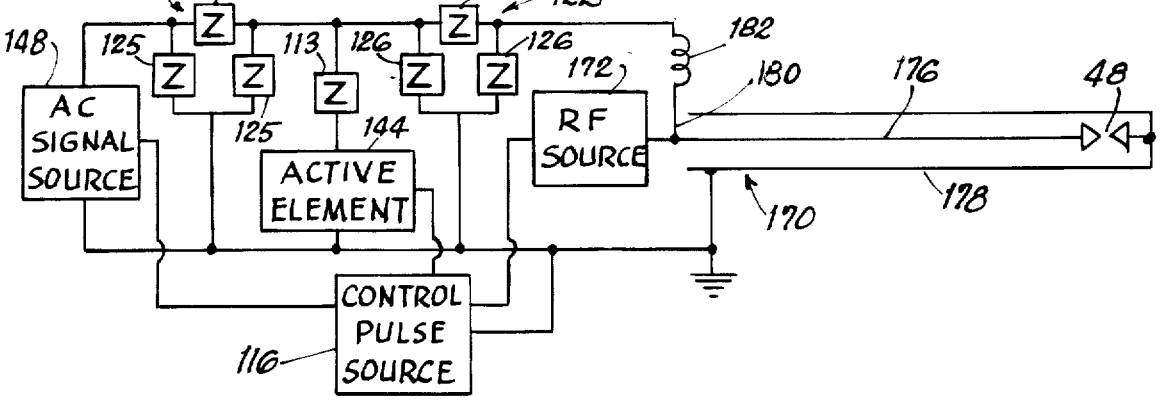
FIG. 20 is a circuit diagram showing a modified and generalized version of the spark source of FIG. 19.

FIG. 20 illustrates a spark source which is similar to that shown in FIG. 19, but with some previously discussed modifications. Thus, the inductance coils 51 and 52 are replaced with the complex or generalized impedances 121 and 122 of FIG. 12. The impedance 113 of FIG. 11 is employed in the shunting circuit. The rectifier 74 is replaced by the active element 144 of FIG. 14. Instead of the capacitor 18, the spark source of FIG. 20 employs the alternating current signal source 148 of FIG. 15. As discussed in connection with FIGS. 14 and 15, the active element 144 is triggered by pulses from the control pulse source 116. Pulses or signals from the source 116 are also employed to trigger the radio-frequency source 172.

The spark source of FIG. 20 is well adapted for use of coaxial transmission lines as the complex impedances 121 and 122. The voltage involved can be kept down to a level within the rated voltage of commercially available coaxial cables. By using coaxial cables of various lengths, the waveform of the spark current can be greatly changed.

I claim:

1. A spark *type light* source *for producing light for spectroscopic analysis,* comprising

[a] *an analytical* spark gap, a storage capacitor means for causing said capacitor to be discharged across said spark gap, first and second [reactive elements] *inductive devices* connected between said capacitor and said spark gap to carry the discharge current, and a rectifier shunted across said spark gap and said second [reactive element] *inductive device* to modify the waveform of the discharge current across said spark gap.

[2. A spark source according to claim 1, in which said first reactive element is predominantly inductive.]

[3. A spark source according to claim 1, in which said second reactive element is predominantly inductive.]

4. [A spark source according to claim 1, in which] *A spark type light source for producing light for spectroscopic analysis,*

*comprising an analytical spark gap,*

*a storage capacitor,*

*means for causing said capacitor to be discharged across said spark gap,*

*first and second reactive elements connected between said capacitor and said spark gap to carry the discharge current,*

*and a rectifier shunted across said spark gap and said second reactive element to modify the waveform of the discharge current across said spark gap,* said first reactive element [includes] *including* an inductance coil.

5. [A spark source according to claim 1, in which] *A spark type light source for producing light for spectroscopic analysis,*

*comprising an analytical spark gap,*

*a storage capacitor,*

*means for causing said capacitor to be discharged across said spark gap,*

*first and second reactive elements connected between said capacitor and said spark gap to carry the discharge current,*

*and a rectifier shunted across said spark gap and said second reactive element to modify the waveform of the discharge current across said spark gap,* said second reactive element [includes] *including* an inductance coil.

6. [A spark source according to claim 1, in which] *A spark type light source for producing light for spectroscopic analysis,*

*comprising an analytical spark gap,*

*a storage capacitor,*

*means for causing said capacitor to be discharged across said spark gap,*

*first and second reactive elements connected between said capacitor and said spark gap to carry the discharge current,*

*and a rectifier shunted across said spark gap and said second reactive element to modify the waveform of the discharge current across said spark gap,* said first reactive element [is] *being* adjustable in inductive reactance.

7. [A spark source according to claim 1, in which] *A spark type light source for producing light for spectroscopic analysis,*

*comprising an analytical spark gap,*

*a storage capacitor,*

*means for causing said capacitor to be discharged across said spark gap,*

*first and second reactive elements connected between said capacitor and said spark gap to carry the discharge current,*

*and a rectifier shunted across said spark gap and said second reactive element to modify the waveform of the discharge current across said spark gap,* said second reactive element [is] *being* adjustable in inductive reactance.

8. [A spark source according to claim 1, in which] *A spark type light source for producing light for spectroscopic analysis,*

*comprising an analytical spark gap,*

*a storage capacitor,*

*means for causing said capacitor to be discharged across said spark gap,*

*first and second reactive elements connected between said capacitor and said spark gap to carry the discharge current,*

*and a rectifier shunted across said spark gap and said second reactive element to modify the waveform of the discharge current across said spark gap,* said first and second reactive elements [are] *being* adjustable in inductive reactance to provide for adjustment of the waveform.

9. [A spark source according to claim 1, in which] *A spark type light source for producing light for spectroscopic analysis,*

*comprising an analytical spark gap,*

*a storage capacitor,*

*means for causing said capacitor to be discharged across said spark gap,*

*first and second reactive elements connected between said capacitor and said spark gap to carry the discharge current,*

*and a rectifier shunted across said spark gap and said second reactive element to modify the waveform of the discharge current across said spark gap,* said first reactive element [comprises] *comprising* a transmission line.

10. [A spark source according to claim 1, in which] *A spark type light source for producing light for spectroscopic analysis,*

*comprising an analytical spark gap,*

*a storage capacitor,*

*means for causing said capacitor to be discharged across said spark gap,*

*first and second reactive elements connected between said capacitor and said spark gap to carry the discharge current,*

*and a rectifier shunted across said spark gap and said second reactive element to modify the waveform of the discharge current across said spark gap,* said second reactive element [comprises] *comprising* a transmission line.

11. [A spark source according to claim 1, in which] *A spark type light source for producing light for spectroscopic analysis,*

*comprising an analytical spark gap,*

*a storage capacitor,*

*means for causing said capacitor to be discharged across said spark gap,*

*first and second reactive elements connected between said capacitor and said spark gap to carry the discharge current,*

*and a rectifier shunted across said spark gap and said second reactive element to modify the waveform of the discharge current across said spark gap,* said first and second reactive elements [comprise] *comprising* first and second portions of the same inductance coil.

12. [A spark source according to claim 1, in which] *A spark type light source for producing light for spectroscopic analysis,*

*comprising an analytical spark gap,*

*a storage capacitor,*

*means for causing said capacitor to be discharged across said spark gap,*

*first and second reactive elements connected between said capacitor and said spark gap to carry the discharge current,*

*and a rectifier shunted across said spark gap and said second reactive element to modify the waveform of the discharge current across said spark gap,* said first and second reactive elements [are] *being* constructed and arranged to produce coupling therebetween.

13. [A spark source according to claim 1, in which] *A spark type light source for producing light for spectroscopic analysis,*

*comprising an analytical spark gap,*

*a storage capacitor,*

*means for causing said capacitor to be discharged across said spark gap,*

*first and second reactive elements connected between said capacitor and said spark gap to carry the discharge current,*

*and a rectifier shunted across said spark gap and said second reactive element to modify the waveform of the discharge current across said spark gap,* said first and second reactive elements [comprise] *comprising* respective first and second coupled inductance elements.

14. A spark *type light* source according to claim 1, in which said rectifier is polarized in a direction opposite from the initial surge of discharge current across said spark gap.

15. A spark *type light* source according to claim 1, including means for selectively reversing the polarization of said rectifier.

16. A spark *type light* source according to claim 1, including a reversing switch for selectively connecting said rectifier to be conductive in either direction.

17. [A spark source according to claim 1, in which] *A spark type light source for producing light for spectroscopic analysis,*

*comprising an analytical spark gap,*

*a storage capacitor,*

*means for causing said capacitor to be discharged across said spark gap,*

*first and second reactive elements connected between said capacitor and said spark gap to carry the discharge current,*

*and a rectifier shunted across said spark gap and said second reactive element to modify the waveform of the discharge current across said spark gap,* said second reactive element [is] *being* adjustable in inductive reactance, said rectifier being polarized in a direction opposite to the initial surge of the discharge current across said spark gap.

18. A spark *type light* source according to claim 1, including at least one additional spark gap in series with said first mentioned spark gap.

19. A spark *type light* source according to claim 1, including a control spark gap connected in series with said first mentioned spark gap, and electronic switching means connected across said control spark gap for initiating the discharge of said capacitor.

20. A spark *type light* source according to claim 19, in which said electronic switching means comprise a controllable arc discharge tube.

21. A spark *type light* source according to claim 1, including a plurality of control spark gaps connected in series with said first mentioned spark gap, and electronic switching means connected across one of said control spark gaps for initiating the discharge of said capacitor.

22. A spark *type light* source according to claim 1, in which said capacitor, said spark gap and said first and second [reactive elements] *inductive devices* are included in a series oscillatory circuit to produce an oscillatory discharge current across said spark gap.

23. A spark *type light* source according to claim 1, in which said rectifier is shunted across the series combination of said spark gap and said second [reactive element] *inductive device.*

24. A spark *type light* source according to claim 1, in which said rectifier comprises a controlled rectifier.

25. A spark *type light* source according to claim 1, in which said means comprises switching means in circuit with said spark gap.

26. A spark *type light* source according to claim 1, in which said means comprises electronic switching means in circuit with said spark gap.

27. A spark *type light* source *for producing light for spectroscopic analysis,* comprising

[a] *an analytical* spark gap, an impedance connected to said spark gap, said impedance comprising [reactive means] *an inductive device,* means including an alternating current source for producing a discharge current through said impedance and across said gap, and an active circuit element connected in shunt with said impedance and said spark gap for modifying the waveform of the discharge current across said gap, said active element being constructed and arranged to be conductive during a portion of the altrnating current from said source.

28. A spark *type light* source according to claim 27, in which said active element comprises a rectifier.

29. A spark *type light* source according to claim 27, in which said active element comprises a silicon controlled rectifier.

30. A spark *type light* source according to claim 27, in which said active element comprises a silicon controlled switch.

31. A spark *type light* source according to claim 27, in which said active element comprises a Triac.

32. A spark *type light* source according to claim 27, in which said active element comprises an electron discharge tube.

33. A spark *type light* source according to claim 27, in which said source includes a storage capacitor and means for charging said capacitor, said capacitor being discharged through said impedance and across said gap to produce said discharge current.

[34. A spark source according to claim 27, in which said reactive means comprises an inductive element.]

35. [A spark source according to claim 27, in which] *A spark type light source for producing light for spectroscopic analysis, comprising*

*an analytical spark gap,*

*an impedance connected to said spark gap,*

*said impedance comprising reactive means,*

*means including an alternating current source for producing a discharge current through said impedance and across said gap,*

*and an active circuit element connected in shunt with said impedance and said spark gap for modifying the waveform of the discharge current across said gap,*

*said active element being constructed and arranged to be conductive during a portion of the alternating current from said source,* said reactive means [comprises] *comprising* an inductance coil.

36. [A spark source according to claim 27, in which] *A spark type light source for producing light for spectroscopic analysis, comprising*

*an analytical spark gap,*

*an impedance connected to said spark gap,*

*said impedance comprising reactive means,*

*means including an alternating current source for producing a discharge current through said impedance and across said gap,*

*and an active circuit element connected in shunt with said impedance and said spark gap for modifying the waveform of the discharge current across said gap,*

*said active element being constructed and arranged to be conductive during a portion of the alternating current from said source,* said reactive means [comprises] *comprising* an adjustable inductance coil.

37. [A spark source according to claim 27, in which] *A spark type light source for producing light for spectroscopic analysis, comprising*

*a spark gap,*

*an impedance connected to said spark gap,*

*said impedance comprising reactive means,*

*means including an alternating current source for producing a discharge current through said impedance and across said gap,*

*and an active circuit element connected in shunt with said impedance and said spark gap for modifying the waveform of the discharge current across said gap,*

*said active element being constructed and arranged to be conductive during a portion of the alternating current from said source,* said reactive means [comprises] *comprising* a transmission line.

38. [A spark source according to claim 27, in which] *A spark type light source for producing light for spectroscopic analysis, comprising*

*a spark gap,*

*an impedance connected to said spark gap,*

*said impedance comprising reactive means,*

*means including an alternating current source for producing a discharge current through said impedance and across said gap,*

*and an active circuit element connected in shunt with said impedance and said spark gap for modifying the waveform of the discharge current across said gap,*

*said active element being constructed and arranged to be conductive during a portion of the alternating current from said source,* said reactive means [comprises] *comprising* a coaxial cable.

39. A spark *type light* source according to claim 27, including switching means in series with said spark gap for initiating the discharge current across said spark gap.

40. A spark *type light* source according to claim 27, including electronic switching means in series with said spark gap for initiating the discharge current across said spark gap.

41. A spark *type light* source according to claim 27, *including means for breaking down said spark gap to initiate the discharge current across said gap.*

42. A spark *type light* source according to claim 27, including means for ionizing said spark gap to initiate the discharge current across said gap.

43. A spark *type light* source according to claim 27, including a high voltage radio-frequency source connected to said spark for breaking down said spark gap to initiate the discharge current across said gap.

44. A spark *type light* source according to claim [27] *35*, [in which said reactive means comprises inductive means,] *in which* said active circuit element [comprising] *comprises* a rectifier.

[45. A spark source according to claim 27, in which said impedance comprises a silicon controlled rectifier.]

[46. A spark source according to claim 27, in which said impedance comprises a solid state switching device.]

47. A spark *type light* source according to claim 27, in which said active circuit element comprises a rectifier, said impedance comprising an inductance coil.

[48. A spark source according to claim 27, in which said active circuit element comprises an adjustable inductance coil.]

[49. A spark source according to claim 27, in which said active circuit element comprises a transmission line.]

50. A spark *type light* source accoding to claim 27, in which said source includes a storage capacitor which is adjustable in capacitance.

51. A spark *type light* source according to claim 27, in which said active circuit element comprises a rectifier which is polarized in a direction opposite to the initial surge of the discharge current.

[52. A method of producing radiation for spectral analysis, comprising the production of an electrical spark discharge having an oscillatory electrical spark current waveform, said spark discharge being produced in the presence of a material to be analyzed, causing said waveform to have alternate first and second repetitive half-cycles in which said first half-cycle in each case has a spark current of a sufficiently great peak magnitude to produce intense vaporization of said material, and in which said second half-cycle in each case has a spark current of a substantially smaller magnitude than the previously-mentioned magnitude for producing a superior spectrum for analytical purposes.]

[53. A method according to claim 52, including the utilization of time-resolved spectroscopy to produce time-resolved spectra of the radiation derived from said second repetitive half-cycles.]

*54. A spark type light source for producing light for spectroscopic analysis, comprising*

*an analytical spark gap,*

*an impedance connected to said spark gap,*

*said impedance comprising an inductive device,*

*means including an alternating current source for producing a discharge current through said impedance and across said gap,*

*and an active circuit element connected in shunt with said impedance and said spark gap for modifying the waveform of the discharge current across said gap,*

*said active element being constructed and arranged to be conductive during a portion of the alternating current from said source,*

*said active element comprising a rectifier,*

*said source including a storage capacitor and means for charging said capacitor,*

*said capacitor being discharged through said impedance and across said gap to produce said discharge current.*

*55. A spark type light source, for producing light for spectroscopic analysis, comprising*

*an analytical spark gap,*

*an impedance connected to said spark gap,*

*said impedance comprising an inductance coil,*

*means including an alternating current source for producing a discharge current through said impedance and across said gap,*

*and an active circuit element connected in shunt with said impedance and said spark gap for modifying the waveform of the discharge current across said gap,*

*said active element being constructed and arranged to be conductive during a portion of the alternating current from said source,*

*said active element comprising a rectifier,*

*said source including a storage capacitor and means for charging said capacitor,*

*said capacitor being discharged through said impedance and across said gap to produce said discharge current.*

* * * * *